J. F. MAYS.
COMBINED TYPE WRITER AND CALCULATOR.
APPLICATION FILED APR. 10, 1906.

1,108,921.

Patented Sept. 1, 1914.
5 SHEETS—SHEET 3.

Witnesses
Edwin L. Bradford
P. H. Burch

Inventor
James F. Mays
By
Robt. D. Johnston Jr.
Attorney

UNITED STATES PATENT OFFICE.

JAMES F. MAYS, OF BIRMINGHAM, ALABAMA, ASSIGNOR, BY MESNE ASSIGNMENTS, TO MAYS ACCOUNTING MACHINE COMPANY, OF ASHEVILLE, NORTH CAROLINA, A CORPORATION OF NEVADA.

COMBINED TYPE-WRITER AND CALCULATOR.

1,108,921. Specification of Letters Patent. Patented Sept. 1, 1914.

Application filed April 10, 1906. Serial No. 311,006.

*To all whom it may concern:*

Be it known that I, JAMES F. MAYS, a citizen of the United States, residing at Birmingham, in the county of Jefferson and State of Alabama, have invented new and useful Improvements in Combined Type-Writers and Calculators, of which the following is a specification.

My invention relates to a combined typewriting and calculating machine.

It is broadly the object of my invention to provide a comparatively simple and inexpensive machine which may be simple or compound and which is adapted to operate as a typewriter or as an adding machine, or to combine both of these functions by enabling items to be listed by the typewriting mechanism and their total computed and displayed by the calculating mechanism.

The broad idea resides in the provision of complete and independent typewriting and calculating mechanisms having means to connect them up, when desired, for the coöperative action above described.

It is a further purpose of my invention to enable items, which have been printed in the usual manner by the typewriter to be added and their total set up by the calculating mechanism in such a manner that, if desired, it may be printed into the typewritten letter containing the items. The object of this is to avoid the printing of the totals by the typewriting mechanism which involves delay and probable error in transfer. To this end I provide any desired character of typewriting machine with a set of type dials which are adapted to print through the typewriter ribbon against the platen, these dials being actuated by mechanism which is adapted to be operated either separately or conjointly with the typewriting mechanism.

It is a further object to provide a machine of the character described with two separate key-boards, one for operating the typewriting mechanism and the other the calculating mechanism, these key-boards being juxtaposed and adapted to independently operate printing and totaling devices or suitable indicating dials also arranged in juxtaposition.

A still further object of my invention is to provide for securing a coöperative or joint action of the two key-boards, whereby the depression of a calculating key will perform the double function of printing a numeral with the typewriting devices, and adding that numeral on the calculating dials, said key boards being adapted to be readily disconnected for independent use.

My invention further comprises the novel arrangement of the total printing dials to the right of the typewriting printing machine so as to take advantage of the shift to the right of the platen to enable both printing means to jointly print on a common sheet with a minimum of delay and inconvenience to the operator.

My invention also comprises means to prevent the dials, to the left of the one of highest degree which has been moved, from printing zeros in front of the total. This I do by the provision of a thin cloth strip adapted to be interposed between the ribbon and platen and moved over the dials: automatic stop devices being provided to bring the strip to rest at the proper point for the above purposes.

A specific embodiment of my invention is illustrated in the accompanying drawings, in which:—

Fig. 10, is a detail view of the toothed reset plate.

12 and 13, are plan and end views respectively, of the stop mechanism for the arm carrying the flexible shield.

Similar reference numerals refer to similar parts throughout the drawings.

My invention is illustrated as applied to a Remington typewriter, though it may be readily adapted for use in connection with any of the other standard makes, and I have selected for the purposes of illustration the arrangement of the calculator keyboard and mechanism below the typewriter mechanism, though other arrangements may be selected.

Figures 2, 11:
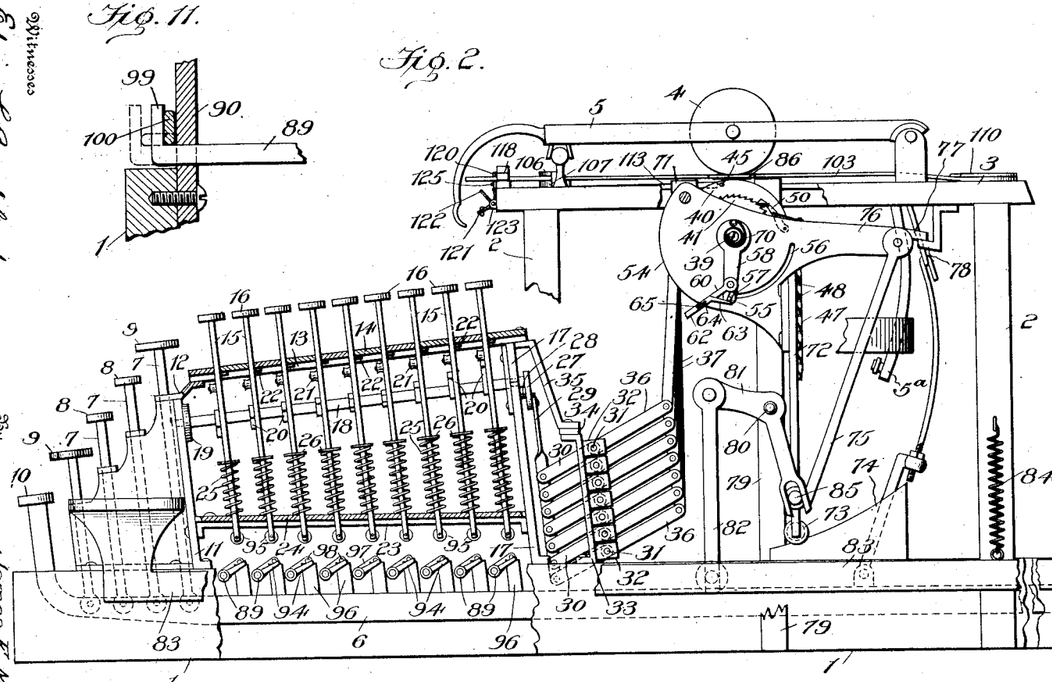
Fig. 2, is a side elevation of Fig. 1, partially broken away to show the calculating mechanism in vertical section and elevation.
Fig. 11, is a detail view in section of a cam shaft which adjusts the transmission rock shafts. Figs.
Figure 3:
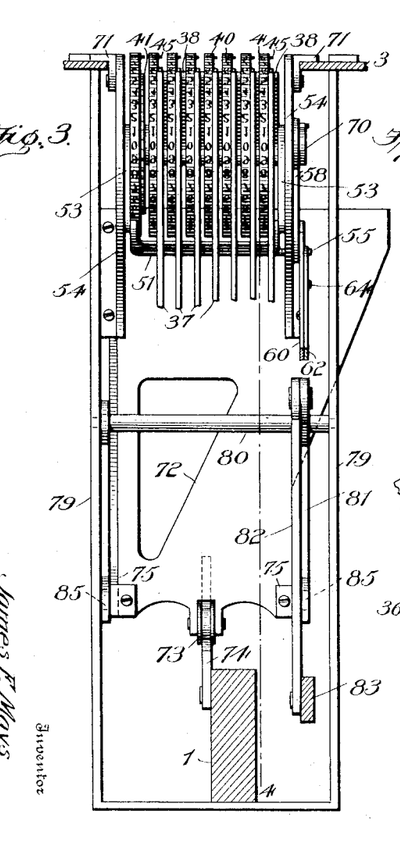
Fig. 3, is a front view of the dial supporting carriage.

The typewriter comprises the base 1 which is made slightly longer and wider than the present Remington base. The standards 2 support the top 3 provided with the platen 4 and its carriage 5. The type-bars or type-keys 5ª are arranged in basket form and are operated by the key levers 6, in the usual manner, said levers being pivoted at their rear ends and connected at their front ends to the stems 7 of the keys 8. In the drawings I have indicated but one of the type bars 5ª of a Remington typewriter, it being understood of course that the typewriter here employed is equipped with the usual number of such type bars. Furthermore, I have indicated this type bar in but one view (Fig. 2), since the construction is well understood, and it is unnecessary to further illustrate it. These keys are arranged according to the universal key-board, and are each adapted to print in the upper case when the upper case keys 9 are operated to shift the platen. The space bar is 10.

The construction as thus briefly described, differs in no wise from the Remington machine construction except that its key-board is set sufficiently forward to enable the calculator key-board to be disposed between it and the printing devices.

Figure 8:
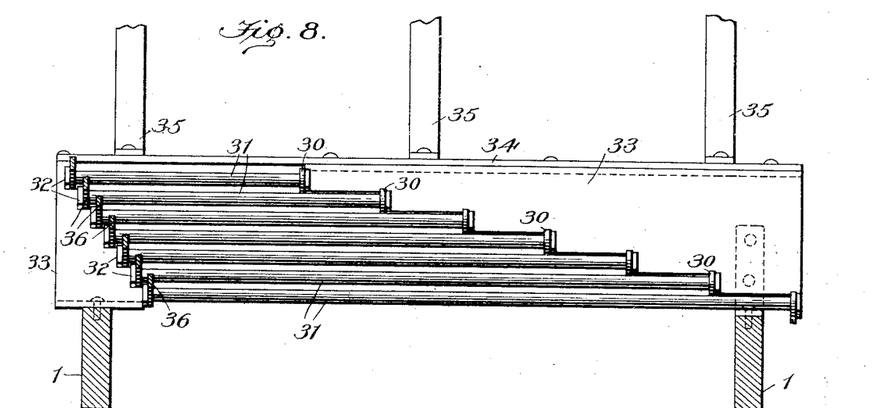
Fig. 8, is a rear view of the counter-rock shafts.
Figure 9:
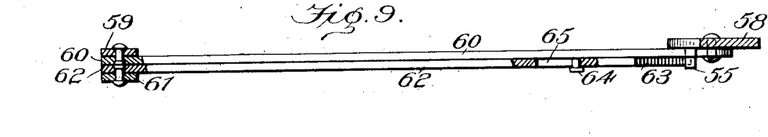
Fig. 9, is a detail plan view of the lever to print and the lever to reset the dials.

The transverse partition plate 11 back of the typewriter key-board supports an angle plate 12 which extends across the machine and is bolted under the cross plates 13 and the top plate 14, forming the top through which the stems 15 of the calculator keys 16 pass. These keys are arranged in rows lengthwise of the machine, each row having its finger pieces numbered from 1 to 9, beginning at the front. Seven of these rows are shown, but a greater or less number may be used according to the capacity desired for the machine. At the rear of the calculator key-board I provide a second transverse plate 17 bolted to the sides of the frame and disposed above the key levers 6. This plate supports the top plates 13 and 14 and serves as the inner bearing for a series of rock shafts 18 which project therethrough. At their front ends these shafts are journaled in the plate 11 and connected to coiled springs 19 attached to said plate. I provide a shaft for each row of keys 16 and connect to it nine rocker arms 20, disposed from front to rear at successively decreasing angles to the top. Each key stem 15 carries a roller 21, adapted to engage its respective arm 20, and a stop pin 22, which engages the top plate 14, thereby limiting the up stroke of the keys. Metal bars 23, bolted to the plates 11 and 17, support the plate 24 through which the lower ends of the stems pass and which supports springs 25 that surround the stems and bear against collars 26 thereon, thereby serving to return the keys to initial position after operation and to limit their down stroke. Arms 27 are rigidly connected to the ends of the shafts 18 beyond the plate 17, and are normally held against stop pins 28 on said plate by the action of the coiled springs 19. At their outer ends each of these arms 27 is connected by a bar 29 to a crank 30 connected to the left hand end of a counter-rock shaft 31. There are seven of these counter-rock shafts 31 which are journaled between lugs 32 struck up from two stepped plates 33 which are disposed transversely of the machine, being bolted below to each side of the base 1, as seen in Fig. 8, and at their upper ends to a cross-bar 34. This cross-bar supports these angled brace plates 35 which are connected to the rear edge of the top plate 14.

Figure 1:
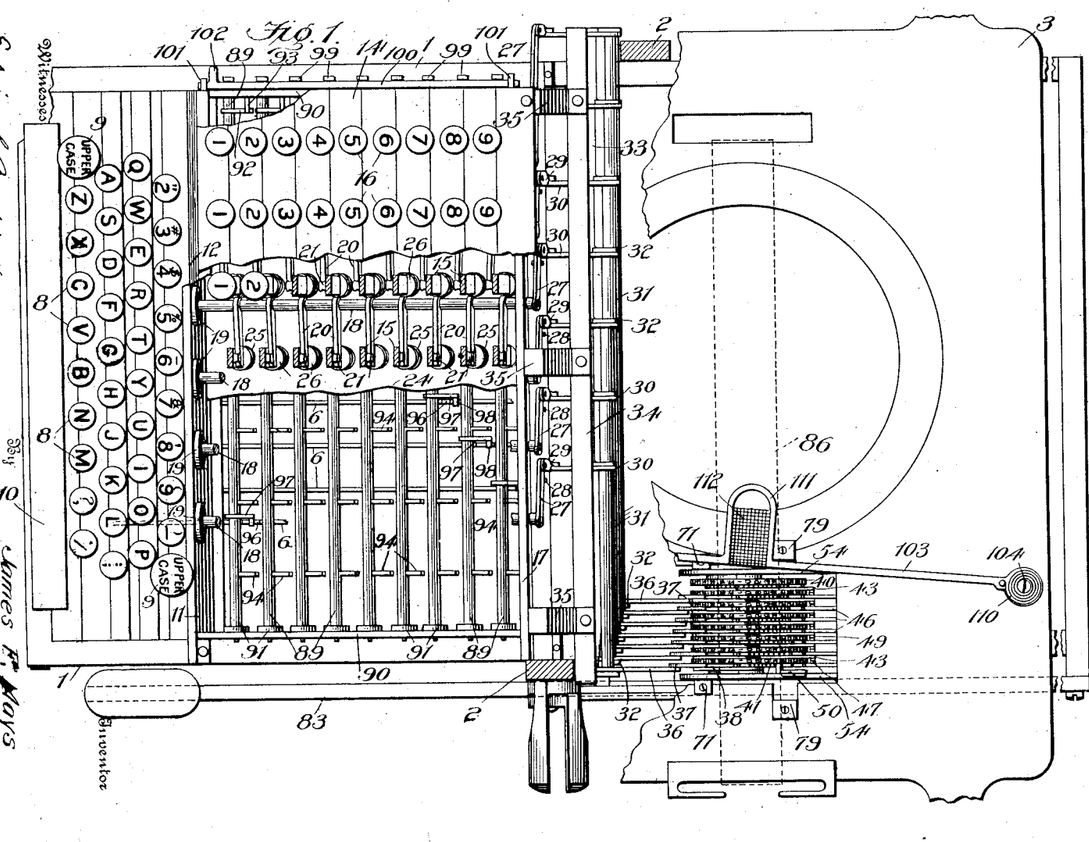
Figure 1, represents a top plan view of the machine with the type-bar platen removed and the top of the calculator key-board broken away to illustrate the inclosed mechanism.
Figure 4:
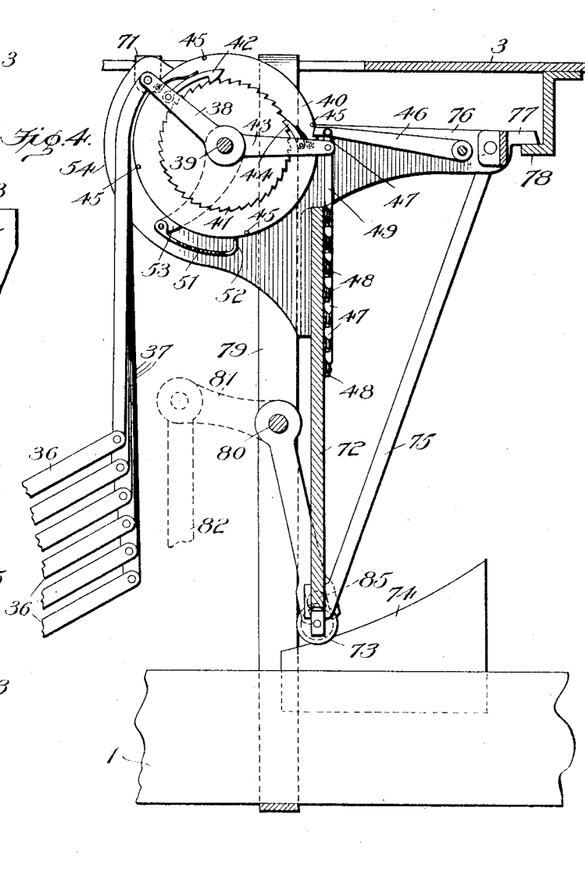
Fig. 4, is a side elevation of the same taken on the line 4—4, of Fig. 3.
Figures 5, 6, 7:
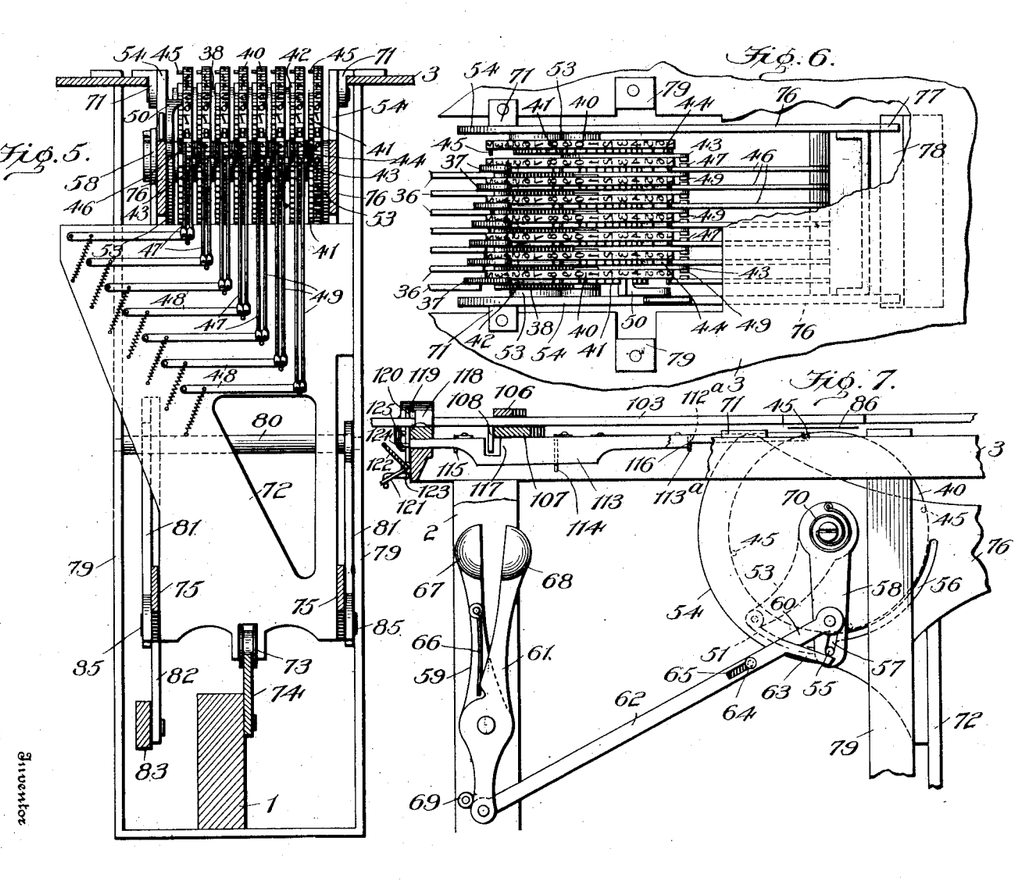
Fig. 5, is a rear elevation of the plate for the carrying mechanism illustrating a rear view of the dials.
Fig. 6, is a top plan view of the dials and their operating mechanism.
Fig. 7, is an enlarged detail view of an operating mechanism for the dials and their resetting devices.

Each of the counter-rock shafts carries a crank arm 36, these several arms being disposed one above the other in a narrow transverse space at the right hand side of the machine as seen in Figs. 1 and 8. Each arm 36 is swivelly connected to an arm 37 which engages a second arm 38 journaled on the shaft 39 for the calculator dials 40. There are eight of these dials, one in excess of the number of rock shafts 18 and arms 38, and each of these dials is provided with or connected to a ratchet wheel 41, with which, except in the case of the last dial at the left, a spring-pressed dog 42 on one of the arms 38 engages. I also provide as best seen in Figs. 4 and 6 seven carrying arms 43, one disposed to the right of all but the first dial and mount these loosely on the shaft 39. Each arm 43 carries a spring-pressed dog 44, reversely disposed to dog 42 and adapted by engaging the adjacent ratchet wheel 41 to both advance it in the same direction as dog 42 and also to prevent any reverse movement of the dials. Each dial preferably carries four sets of type digits from zero to 9 and four pins 45, which pins project from the sides of the wheel in position to engage one of a set of seven pivoted carrying levers 46 and lift it so that, by means of an arm 47 connected to said lever and to a spring-pressed pivoted arm 48 which in turn is connected by a second arm 49 to the outer end of the carrying arm 43, which co-acts with the adjacent dial to the left, the dial of next higher degree may be advanced one point for the purpose of carrying from dial to dial. I provide a special spring-pressed dog 50 to prevent reverse movement of the unit dial on the right. No carrying lever 46 is needed for the last dial to the left.

The manner in which items are set on the wheels 40 and the totals carried, is more fully described in United States Patent No. 899,229, granted to me September 22, 1908, and in which said mechanism is claimed. Briefly, the depressing of the first key 16 in the units row will depress its stem 15, and by means of the roller 21 engage the rocker arm 20 of the first shaft 18 and move it one step. This movement, through the arms 27, 29, and the crank 30, will rock the upper counter-rock shaft and depress its arm 36, thereby drawing down an arm 37, and, by means of an arm 38 and dog 42, advancing the item dial one step or tooth. The depression of the "9" key in the units row will rock the shaft 18 nine times as far as it was rocked by the first key and will advance the item dial nine steps, each step exposing a succeeding type digit in the printing position at the top of the dial. In this manner the several dials are directly moved by the keys in their respective rows, their movements being determined by the value of the keys depressed in such rows. In carrying, as the type digit "9" of each set on a dial is brought to the printing or top position, one of the pins 45 will engage a transverse lever 46 to the right of said dial and, when the said dial has been advanced to expose the zero digit of a succeeding set, the lever will have been moved by the pin to carry one to the dial of next higher degree by means of the arms 47, 48, 49, 43 and the dog 44. The carrying movement of the lever 46 being short, any continued movement of the dial from which the carrying was effected will move the pin past the carrying lever which then drops back in position to be engaged by the next pin as the wheel is rotated.

Figures 10, 13:
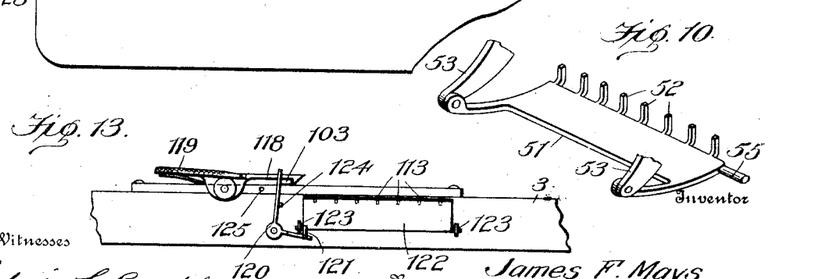

The resetting mechanism, which in principle also forms a part of my aforesaid pending application, comprises a rock plate 51 Fig. 10 carrying eight teeth 52. At its front side the plate is pivotally connected to two arms 53 which are loosely hung on the dial shaft 39 and disposed next inside of the bearing plates 54 in which said shaft is journaled. A stud 55 projects to the right from the rear end of the plate and passes through a curved slot 56 in the outside bearing plate 54. At its front end, the slot is notched to permit the pin 55 to drop down and move the teeth 52 out of the path of the pins 45. The stud 55, when moved upwardly in position to enter the slot 56, brings the teeth on the plate into the path of the pins 45 on all of the dials. If now the plate be moved to the rear, it will swing around the shaft 39, the dogs being held in their raised position by the travel of the stud 55 in the groove 56, and the teeth 52 will pick up a pin on each dial and move it to position where a zero type of one of the sets of digits thereon will be exposed. The stud 55 as seen in Fig. 7 projects through an elongated slot 57 in an arm 58 loosely journaled on the right hand end of shaft 39 beyond the outer bearing plate 54. To swing the reset plate to the rear, I provide a lever 59 (Fig. 7) pivoted intermediate its ends to the right forward standard 2 and connect its lower end to an arm 60 swivelly connected to the arm 58. To lift the plate and move the stud opposite the slot 56, I provide a lever 61 pivoted on the same bearing pin as the lever 59 and connected at its lower end to an arm 62 bent at its outer end 63 to form a slanting face which is disposed under the stud. This arm 62 lies against arm 60 and is held in slidable engagement therewith by a headed pin 64 which passes through a slot 65 in arm 62 and is connected to the arm 60. This pin and slot serve also as a stop means for arm 62. A spring 66, carried by the lever 59, presses against the lever 61 and holds the levers apart and the pin 64 at the right hand end of the slot. By grasping the half handles 67 and 68 at the upper ends respectively of the levers 59 and 61 and drawing these together, the lever 68 will act to throw the arm 62 to the rear so that its end 63 will move under the stud 55 and lift it to the top of the slot 57 and opposite the curved slot 56. If the two arms are then drawn toward the front of the machine, the arm 60 will swing the reset plate to the rear until the stud 55 strikes the end of the slot 56. This will set all of the type wheels to print zero. A stop pin 69 is provided to limit the return travel of the arms 60 and 62, due to the action of a coiled spring 70 connected to shaft 39 and adapted to swing arm 58 and the reset mechanism back to initial position after each operation.

By the mechanism described, the totals of any items set up on the dials 40 will be properly carried and a row of type digits on the dials positioned to print the total. This printing is effected in the following manner: The bearing plates 54 are pivotally connected at their upper forward ends to two bearing plates 71 (Figs. 4 and 5) connected to the top 3 of the machine and disposed on each side of the opening therein through which the upper peripheries of the dials project slightly. The bearing plates 54 are connected at their rear ends to a plate 72 (Fig. 4) on which the several arms 48 and their springs are mounted. This plate is disposed substantially vertically, and at or near the middle of its bottom edge is provided with a flanged roller 73 journally connected thereto. This roller is adapted to run on a track 74 formed by a metal plate bolted to a side of the base parallel therewith. The upper edge of this plate is curved on an arc struck from the pivot point of the plates 54. From each side of the plate braces 75 extend upwardly and connect to the rear extension arms 76 of the plates 54 which project over and behind the plate 72. These extensions terminate in ends 77 which rest upon an angular plate 78 bolted to the under side of the top 3. This plate 78 serves to stop the downward swing of the plates 54 on their pivots. I provide a U-shaped metal frame 79, the upper ends of which are bent outwardly and rest on each side of the dial opening. This frame passes under the side bar of the base 1 and may be bolted thereto and to the top if desired. At a point below the plate 54 and to the front of the plate 72, I provide a shaft 80, which is journally mounted in the frame 79 and has connected thereto a bell crank lever 81. At its front end this lever is connected by a link 82 to the printing lever 83 which is pivoted at the rear end of the base and normally held in initial position by a coiled spring 84 connected to one of the rear standards 2. At its other end the bell crank lever 81 is bifurcated and straddles a pin 85 carried by the lower outside edge of the plate 72. By depressing the lever 83, the bell crank lever swings the plates 72 and 54 to the rear, causing the wheel 73 to ride up the curved track 74. This will lift the printing dials by swinging the plates 54 around their pivots with a rapid stroke, thereby bringing the dials into engagement with the platen to print the total which has been set up on them, the typewriter ribbon 86 extending over the dials so that they do their printing like the type bars, by a quick stroke against the platen. This printing movement of the dials and their supporting frame must take place without disturbing the dial operating mechanism which it will be remembered is positively connected to the dials. To this end it will be noted that the point of pivotal connection between the dial operating levers 37 and the arms 38 is in line with the pivots for the dial frame so that the frame and arms 38 swing together without disturbing the connection between the dials and their operating devices.

As thus far described, the typewriter machine and the calculator represent independent mechanisms which are assembled in the same machine and coöperate to the extent of printing against the same platen. One of the most important features of my invention resides in the manner in which the two key-boards are caused to coöperate so that any desired number or sets of numbers may be written in a body of the letter or document without shifting or adjusting the carriage, the totals of said numbers being at the same time set up on the dials so that, at any time desired, the correct total may be printed from the dials in the body of the letter or document by merely shifting the platen to the right over the dials and depressing lever 83. This coöperation between the key-boards is effected by the provision beneath the plate 24 of a set of nine transverse rocker shafts 89 journaled so as to be axially adjustable in two vertical plates 90 connected to the sides of the base. Coiled springs 91, carried by the right hand plate 90, are connected to said shafts and act to force stop arms 92 disposed at the other ends of the shafts against elongated stop pins 93. I provide one rocker shaft for each transverse row of keys 16, i. e., one for all of the calculator keys numbered "1", one for the keys numbered "2", etc. These rocker shafts are provided with rocker arms 94 fixed thereto and normally held by springs 91 in the path of the rollers 95 at the lower ends of the stems 15 of the calculator keys. It will thus be seen that the operation of any key numbered "1" in any of the rows will rock the first shaft, and, in a similar manner, the operation of any one of the correspondingly numbered keys of the rows will rock a shaft 89, whose arms 94 are disposed below the keys of that number. The key levers 6, for the typewriter keys 8, pass beneath these shafts 89. Each lever used for printing a number is provided with a vertical lug 96 which projects in the path of a pin 98 on an arm 97 keyed to one of the shafts 89. Thus the lug 96 on the typewriter lever operated by the "7" key, will be engaged by the arm 97 on the shaft 89 which is rocked by the calculator keys bearing the numeral "7", and the typewriter lever for the letter "L" is adapted to be engaged by the arm 97 on the shaft 89 operated by the calculator keys bearing the numeral "1". The same arrangement applies for all of the typewriter numeral printing levers. By this means the depression of any calculator key, when the key-boards are set to coöperate, is adapted to perform two functions, i. e., operating its respective dial and depressing a typewriter lever 6 to print the number of the calculator key depressed in the same manner as if one of the typewriter keys had been operated for that purpose.

It will thus be seen that in the case of a letter in which it is desired to introduce numbers without tabulating them on a separate piece of paper, the body of the letter may be written in the usual manner with the typewriter keys, and all such numbers printed thereon by operating the typewriter number keys direct which it is not desired to add. Such numbers, however, as it is desired to add are printed in the letter by depressing the calculating keys in the manner hereinbefore described to set these numbers on the printing wheels. This operation of the calculator will operate the typewriter type bars and print these numbers into the body of the letter. Whenever it is desired to print the total, thus mechanically calculated, in the letter, the platen is shifted to the right over the printing wheels 40 and the printing lever 83 depressed. This forces the total printing wheels against the platen in a manner to print a row of numbers representing the totals of the numbers set up on the wheels by depressing the calculator keys, the tops of said wheels standing normally almost in touch with the platen so that but a slight printing movement is required.

To disconnect the key-boards so that the calculating machine may be operated independently of the typewriter, I provide the left hand ends of the shafts 89, which project through and beyond the plate 90, with upturned ends 99. These several ends are disposed in alinement and are adapted to be held against a flat bar 100 by the action of the springs 91, which are adjusted so that they tend to oppose the axial movements of the shafts to the left. This bar 100 is journaled in clips 101 secured to the plate 90 and is provided with a handle 102. By throwing this handle to the left the bar 100, the upper and lower edges of which are rounded, acts like a cam to move all of the rocker shafts 89 to the left a sufficient distance to disengage the pins 98 and the arms 97 from the several lugs 96, and to move the rocker arms 94 out of the path of the rollers 95 carried by the calculator keys. The position of the stop arms 92, with relation to the side plate 90, is such as to permit of this lateral adjustment without disengagement from the stop pins 93.

Figure 12:
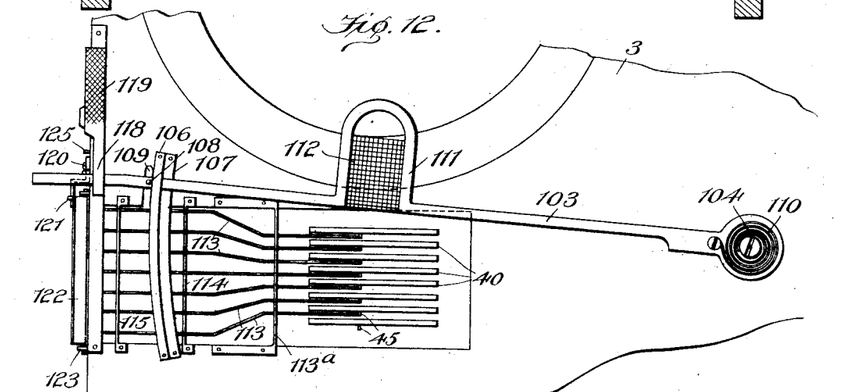

To prevent the printing of ciphers before the total, I provide a lever 103 (Fig. 12) pivoted to a stud 104 at the rear of the machine and having its free end projecting beyond the front of the top in position to be readily grasped and moved laterally. The arm passes between the guide strips 106, 107 connected to the top and spanning the opening therein. The arm is provided with a pin 108 which is normally disposed in an arcuate slot 109 to the left of the opening in the top 3. A coiled spring 110, connected to the stud 104 and to the lever end, tends to hold the latter to its initial position in which the pin 108 is at the left of this slot. This lever is disposed above the typewriter ribbon and is bent at 111 to receive a narrow strip of cloth or thin impervious material 112 in position to be moved over the row of type digits exposed for printing. The lever may be moved to the right to prevent the printing of the type digits set up on the first, second, or any number of the dials, counting from the left. To provide a means to automatically stop the arm in position to prevent the printing of superfluous zeros, I provide opposite the five type dials of highest degree, a set of stop arms 113. The inner ends of these arms pass loosely through slots 112ª in a spring bracket 113ª, which is connected to the top and spans the opening therein. These arms are preferably in the form of thin metallic slats, the inner ends of which adapted to be disposed in the path of the pins 45 on the dials 40. At their outer ends these seats enter openings in the front edge of the top 3. They are guided and braced at intermediate points by a plate 114 notched along its upper edge and a plate onds of these arms pass loosely through slots 115 notched along its under edge and disposed above them. These two plates are bolted to the top and serve to hold the slats against any but longitudinal movement. The slats are shown bent slightly between the plates 113 and 115 to space their outer ends farther apart. Shoulders 116 limit the inward movement of the slats by engagement with the plate 113. When the dials are all in position to print zero, one of the pins 45 on each dial will stand in position to engage the inner end of a slat and move it outwardly when its dial is advanced one point. This outward movement of a slat throws a shoulder 117 into the path of the pin 108 on the arm 103. The arm will therefore be stopped by engagement with the first of these slats to the left which is moved into the path of its pin. From this it follows that the dial of highest degree, which is advanced, will serve by its respective slat to stop the arm 103 in position to prevent, by means of the shield 112, the printing of zeros by any of the dials to the left of said dial of highest value which has been operated. To hold the arm 103 at its initial position against the action of spring 110, I provide a spring-pressed catch 118 pivoted to the top and provided with a finger piece 119, upon the depression of which the arm is released and advanced by the spring to move the shield 112 over the dials until stopped by the engagement of the pin 108 with one of the slat shoulders 117.

To automatically restore the several slats to their initial position after the dials have been reset, I provide a bell crank lever 120 pivoted to the front edge of the top and having one end projecting in the path of the arm 103. The other end of the crank is connected to an arm 121 projecting outwardly from a plate 122, which is provided, at its lower edges, with pivot extensions mounted in the eye-bolts 123 screwed into the top 3. When the dial pins 45 strike the slats, they move them outwardly until the pins pass the slats. This outward movement of the slats causes their ends to project through the front edge of the top 3 in position to be engaged by plate 122 and returned thereby to their initial position when the arm 103 is moved to the left and strikes the bell crank lever 120 and swings the plate upwardly. The plate normally hangs at an angle to the top edge and acts to hold the bell crank lever against a stop pin 124. The catch has a beveled end so that when the lever is thrown to the left by hand, it will knock the catch up and pass under it and strike the bell crank lever moving it against a second stop pin 125. The catch will spring down behind the arm and hold it in position until the finger piece 119 is operated. When a slat has once been operated, the dial pins will not engage it any more until the dials have been reset. They do not therefore interfere with the normal operation of the machine, and, being light, present no noticeable resistance to the dials.

I have thus described in detail one illustrative embodiment of my invention, using in combination with a calculator mechanism forming the subject of certain Letters Patent of the United States hereinbefore referred to a Remington typewriter. It should be understood, however, that the particular nature of the calculator may be varied and also that the character of the typewriter machine may be changed without departing from the spirit of my invention which resides chiefly in the manner in which the key-boards for the two machines can be made to coöperate so that the items may be simultaneously printed by the actual typewriting devices and set up on totaling or item wheels. The typewriter may be entirely independent in its operation from the calculating devices and at the same time the calculating devices may be operated independently of the typewriter by providing means to swing the rocker arms on the shafts 89 out of the path of the rollers 95.

Any suitable apparatus susceptible of enabling the independent typewriting and calculating mechanisms to coöperate may be substituted for the construction shown within the scope of my invention.

Without limitation therefore to the details of construction which have been used to illustrate the preferred embodiment of my invention, what I claim as new and desire to secure by Letters Patent, is:—

1. In a machine of the character described, a plurality of registering devices provided with type digits, a pivoted frame supporting said devices, actuating levers pivotally connected to said devices, the pivot connections for said levers and frame being substantially in alinement, and means to move said levers and frame for the purposes described.

2. In a machine of the character described, a platen, a pivoted frame, type dials journaled in said frame, dial moving arms, key operated levers pivotally connected to said arms in line with the pivotal axes of said frame, and means to rock said frame and move said dials into engagement with said platen for the purposes described.

3. In a machine of the character described, calculator keys and mechanism movable thereby, totaling dials with type digits, a platen, a frame which supports said platen, movable supports for said dials carried by said frame, operating connections between the dials and said mechanism, means to move said supports to bring said dials into engagement with said platen, and means to prevent the imparting of rotary movement to said dials from their operating connections as they move bodily into engagement with said platen, said dials and their operating connections remaining in mesh during the movement of the dials toward the platen.

4. In a combined calculator and typewriter, the combination of a platen, and separate printing mechanisms for the typewriter and calculator adapted to coöperate with said platen, independent key operated levers to directly operate said mechanisms, said calculator printing mechanism being disposed adjacent to and to the right of said typewriter printing mechanism and comprising a set of independently operable type dials mounted in a movable support normally positioned beneath and in close proximity to said platen, and means to detachably couple up the operating levers for the said printing mechanisms substantially as described.

5. In a machine of the character described, the combination with a type-writing mechanism, of calculating dials, mechanism to operate said dials comprising rows of numeral keys from front to rear of the machine, and means to directly transmit differential movements from the keys of each row to the corresponding dial, and means to transmit movement from said dial operating mechanism to said typewriting mechanism, as and for the purposes described.

6. In a machine of the character described, the combination of a typewriter key-board, an independent key-board comprising rows of keys disposed from front to rear of the machine, the keys in each row being numbered from one to nine, and calculating mechanism operated thereby, and means to operate the numeral keys of the typewriter key-board by the keys of said calculating key-board.

7. In combination with a typewriter having its keys arranged in basket form, of a calculating attachment integral therewith and comprising a separate keyboard having rows of nine keys each disposed from front to rear of the machine, a set of type dials, means to transmit differential movements from the keys of each row to its corresponding dial, a movable frame supporting said dials and disposed to the right of the basket of keys, a key to operate said frame, and a platen and ribbon coöperating with the basket of keys and said dials, substantially as described.

8. In a machine of the character described, a typewriter key-board comprising keys and key operated levers and printing mechanism operated thereby, a calculating key-board comprising keys arranged in parallel rows and disposed over said levers, type dials operable by said calculating keys, and means to operate the numeral printing typewriter key levers by said calculating keys.

9. The combination with a typewriting machine comprising a complete key board a plurality of independent key operated members and devices operable thereby to effect the printing of letters and numerals, of calculating type dials, keys comprising a separate key board to operate said dials, and means to transmit motion from said keys to said key operated members of the typewriting machine, and a common platen to coöperate with both printing devices and dials, substantially as described.

10. In a machine of the character described, a complete typewriter comprising a keyboard, key operated printing devices, and a platen, a calculator having a keyboard adjacent to the typewriter keyboard and comprising a series of rows of numeral keys from front to rear, a rocking member differentially operated by the keys of each row, a set of rotatable dials with type digits thereon which are operated by said members, a movable frame supporting said dials to the right of said printing devices and adjacent to said platen, means to swing said dials against said platen, and means to detachably interconnect the key operated mechanisms of both typewriter and calculator.

11. The combination with a typewriter comprising key operated levers and printing mechanism, of calculating mechanism, a controller key-board therefor comprising rows of keys from front to rear of the machine, and means to operate each typewriter lever, adapted to print a numeral, by the several keys of said key-board which bear its corresponding numeral.

12. In a machine of the character described, calculating mechanism, a controller key-board therefor comprising keys arranged in rows from front to rear, keys in each row being numbered from one to nine successively, nine transversely disposed members, each of which is adapted to be operated by a transverse row of correspondingly numbered keys, in combination with typewriting mechanism, a key-board therefor, and connections between said transverse members and said typewriting mechanism which, upon the operation of one of said members, causes the machine to print a numeral, substantially as described.

13. In combination a calculating mechanism, a controller key-board therefor comprising keys arranged in rows from front to rear, transverse rock shafts operated by the corresponding keys of said rows, typewriting mechanism comprising a key-board, key levers, and means to operate each numeral printing lever by one of said rock shafts.

14. In a machine of the character described, calculating mechanism, a controller key-board therefor comprising rows of successively numbered keys, transverse rock shafts each provided with rocker arms and adapted to be engaged and operated by a transverse row of said keys, typewriting mechanism comprising a plurality of numeral printing key operated levers, and a member carried by each rock shaft and adapted to engage and operate the one of said key levers which prints a numeral corresponding to the value of the transverse row of keys by which said shaft is adapted to be operated.

15. In a machine of the character described, calculating mechanism, a controller key-board therefor, typewriting mechanism, a complete separate key-board therefor, means to connect said mechanisms comprising transmission devices adapted to be operated by the calculating keys and to impart motion to the numeral printing parts of the typewriting mechanism, and means to adjust said transmission devices to disconnect said mechanisms.

16. The combination with a typewriting machine and its platen and ribbon, of a group of totaling type dials, a movable frame which carries a journal support for said dials and also carrying mechanism and reset mechanism for said dials, a key operated means to move said frame and cause said dials to print by means of said ribbon against said platen, a key-board for said dials and arms operable from said keyboard and directly connected to said dials.

17. The combination with a typewriting machine, of a plurality of totaling type dials, mechanism for adding numbers on said dials comprising a key-board and key operated rock shafts each connected to a dial, a movable support for said dials, a printing platen for the typewriter, a lever controlled means to move said dials into engagement with said platen, as and for the purposes described.

18. The combination with a typewriting machine comprising a movable platen, a ribbon, and key controlled printing devices coacting therewith, of totaling dials provided with type digits, a key-board comprising a plurality of independently operable keys, and means moved by said keys to operate said dials, means operable by said key-board to print by the typewriter printing devices the items, and means to move said dials against said platen to print by means of said ribbon, and means to permit only those dials necessary to indicate a total to print.

19. In a machine of the character described, a set of totaling type dials, key controlled mechanism to add numbers thereon by moving said dials, means to print from said dials, stops set up by said dials, spring operated means adapted to coöperate with said stops to cause only the dials which are necessary to indicate a total to print, a catch to hold said means in initial position, and a key to release said means.

20. The combination with a typewriting machine having a platen and ribbon, of a set of movable type dials of uniform size which are rotatably mounted upon a common shaft, mechanism to cause said dials to move together to print on said platen by means of said ribbon, a fabric shield, and means to interpose said fabric shield between said ribbon and platen to prevent certain of said dials from printing.

21. In a machine of the character described, a platen, a plurality of totaling type dials, key controlled operating mechanism therefor, means to bring said dials and platen into engagement for the purpose of printing, a spring pressed movable arm carrying a shield of soft thin pliable material adapted to be interposed between one or more of said dials and said platen, and stop mechanism adapted to be set up by said dials which stop said shield in position to permit only the dials necessary to indicate the total to print against the platen.

22. In a machine of the character described, a set of totaling type dials, projections carried by said dials, a platen, means to bring said dials and platen into engagement for the purpose of printing, a swinging, spring-pressed, arm carrying a shield adapted to be interposed between one or more of said dials and said platen, a catch to hold said shield away from said dials and stops for said arm which are positioned by said dials and which arrest the travel of said arm when released from said catch in position where said shield will prevent printing by the dials standing to the left of those requisite to print the total set up on the dials.

23. In a machine of the character described, a set of totaling type dials, a platen and ribbon coöperating therewith for the purpose of printing, a movable arm carrying a flexible shield which is disposed between said ribbon and platen, a catch to hold said shield from above said dials, a set of movable stops to intercept said arm as it moves to bring said shield over said dials, each of said stops being operated by a dial and adapted when the dial is in position to print zero to be held thereby out of the path of said arm, and as soon as the dial has been advanced from zero position to move into the path of said arm, substantially as and for the purposes described.

24. In a machine of the character described, adding mechanism and a controller key-board therefor, typewriting mechanism and key operated levers therefor, transmission means to effect a coöperation between the adding and typewriting mechanism, said transmission means comprising a set of rock shafts, arms on said shafts adapted to be engaged by the keys of the adding mechanism, and cam means to shift said shafts and arms out of the path of said latter keys and disconnect the mechanisms.

25. In a machine of the character described, the combination with a top supporting a movable platen, of a swinging frame hinged to said top, a set of totaling type dials rotatably mounted in said frame, key operated mechanism to directly operate said dials and set up totals thereon, a ribbon interposed between said dials and platen, and lever controlled means to swing said frame and dials into engagement with said platen to print said totals, substantially as described.

26. The combination with a platen, of a hinged frame, a plurality of totaling type dials rotatably mounted therein, key operated mechanism to rotate said dials, a carrying mechanism supported by said frame and adapted to carry from dial to dial, a reset mechanism carried by said frame, an operating lever to move said dials to swing said frame until said dials engage said platen, and an operating lever for said reset mechanism.

27. The combination with a set of rotatable calculating dials, mechanism to operate said dials, carrying mechanism for said dials, and reset mechanism comprising a device adapted to engage projections on said dials, and a pair of levers, one adapted to move said device into the path of said projections, and the other to move said device until it engages said projections and restores the dials to initial or zero position.

28. The combination with a typewriter having a top, a movable platen supported thereon, a frame pivotally connected to said top, a set of dials rotatably mounted in said frame and disposed beneath said platen, an opening in said top above said dials, a roller journaled in said frame, a curved track for said roller, leverage means to swing said frame upwardly into engagement with said platen, and a typewriter ribbon disposed between said dial and platen, substantially as described.

29. The combination in a unitary machine, of a complete typewriter with a calculator key-board, comprising calculator keys, totaling dials directly operated by said keys and provided with type digits, means actuated by the calculator keys to cause said typewriter to print items which are set up on said dials, and key operated means to cause said dials to print a total of items thus set up into the body of a letter being printed by the typewriter.

30. In a machine of the character described, keys forming a complete typewriter key-board, a complete calculator key-board comprising keys in rows of nine each from front to rear, one of said key-boards being positioned above the other, a movable platen, typewriter printing mechanism directly operated from the keys of its key-board, totaling type dials directly operated from the keys of the calculator key-board and adapted to print against said platen and in line with the typewriter printing mechanism, and means to operate the numeral printing parts of the typewriter by the calculator keys.

31. In a machine of the character described, a calculator key-board comprising rows of keys from front to rear, each row being numbered from one to nine, a typewriter key-board including numeral keys, type dials and means to operate them directly from the keys of said calculator key-board, type bars and means to operate them from the keys of said latter key-board, a platen and ribbon coöperating with both dials and bars, and means to connect and disconnect the numeral printing bars with the correspondingly numbered keys of the calculator key-board.

32. In a combined typewriting and calculating machine, keys arranged to form two complete key-boards, one for typewriting mechanism and the other for calculating mechanism, a platen for the typewriting mechanism, total printing devices included in the calculating mechanism and adapted to print against said platen and in line with the typewriting mechanism, and means to interconnect said mechanisms so as by operating the calculator keys to print items with the typewriting mechanism while adding the items on the total printing mechanism.

33. The combination with a typewriting machine and its platen, of a swinging frame, a shaft supported thereby, totaling type dials revolubly mounted on said shaft and provided with ratchet teeth, an arm pivoted on said shaft adjacent to each dial and carrying a dog adapted to engage the said teeth thereon, transfer means and resetting means supported by said frame, key operated members pivotally connected to the free ends of said arms, and journals for said frame carried by said machine and disposed in line with the pivot joints between said arms and members, and means to swing said frame until said dials engage said platen.

34. The combination in a combined typewriter and calculator, of a complete typewriter comprising key operated type-bars and a movable platen with a movable frame, totaling type dials and their carrying mechanism supported by said frame in juxtaposition to said platen, a set of calculator keys, mechanism operable thereby to move said dials, and means to move said frame to print from said dials against said platen.

35. The combination in a combined typewriter and calculator, of a complete typewriter comprising key operated type-bars and a movable platen, with a movable frame, totaling type dials and their carrying mechanism supported by said frame in juxtaposition to said platen, a set of calculator keys, rock shafts differentially operable by said keys and connected to said dials, and a printing key which shifts said frame and causes said dials to move bodily therewith to engage said platen, the connection between the dials and levers having a lost motion-action which permits the former to move bodily without rotation on their axes.

36. The combination with a typewriter and an adding machine having a plurality of series of keys, each series comprising several keys of the same numeral, of means for detachably coupling said machines to cause the automatic operation of the numeral printing keys of the typewriter by all of the corresponding keys of the same numeral of the adding machine.

37. The combination with a typewriter and an adding machine having a plurality of series of keys, each series comprising several keys of the same numeral, of means operated universally by all the keys for the same numeral of the adding machine for automatically operating the corresponding numeral printing key of the typewriter.

38. The combination with a typewriter and an adding machine having numeral indicating devices and a plurality of series of operating keys for said devices, each series comprising several keys of the same numeral, of means operated universally by all the keys for the same numeral of the adding machine for automatically operating the corresponding numeral printing key of the typewriter.

39. A complete calculating mechanism comprising keys and key operated rock shafts, in combination with numeral printing keys of a typewriter, transmission means operable with said rock shafts for transmitting movement to said numeral printing keys, and means to disconnect said transmission means from operating relationship with the said numeral printing keys of the typewriter, substantially as described.

40. In a machine of the class described, the combination with a typewriting mechanism including keys, of an adding mechanism having keys operable manually independently of the keys of the typewriting mechanism, means for controlling the keys of one of said mechanisms by the keys of the other of said mechanisms, and adjustable devices for disabling said controlling means at will.

In testimony whereof I have hereunto set my hand in presence of two subscribing witnesses.

JAMES F. MAYS.

Witnesses:
  THOS. J. WINGFIELD,
  ROBT. D. JOHNSTON, Jr.

Copies of this patent may be obtained for five cents each, by addressing the "Commissioner of Patents, Washington, D. C."